July 25, 1933.  B. BRONSON  1,920,057

COMPOSITE MAT

Filed June 4, 1931

INVENTOR:
BUDD BRONSON.
BY Kwis Hudson & Kent.
ATTORNEYS

Patented July 25, 1933

1,920,057

UNITED STATES PATENT OFFICE

BUDD BRONSON, OF CLEVELAND, OHIO, ASSIGNOR TO THE OHIO RUBBER COMPANY, OF CLEVELAND, OHIO, A CORPORATION OF OHIO

COMPOSITE MAT

Application filed June 4, 1931. Serial No. 542,036.

This invention relates to composite mats of a type suitable for use as floor coverings or for other purposes, and as its principal object aims to provide an improved article of this kind.

Another object of this invention is to provide a composite mat wherein a pad attached to the under side of a rubber tread is formed with a cushion section of loosely compacted fibers and a border section of tightly compacted fibers.

Another object of this invention is to provide a composite mat wherein a fibrous pad, which is coextensive with and attached to the under surface of a rubber tread, is impregnated with binding material along one or more edges thereof.

A further object of this invention is to provide a mat of the type mentioned wherein the border section of the pad is integral with the cushion section, and wherein the tightly compacted fibers of the border section are held together by solidified binding material.

Other objects and advantages of this invention will be apparent from the following description when taken in conjunction with the accompanying sheet of drawings, wherein Figure 1 is a top plan view of a composite mat embodying my invention.

Figure 1:
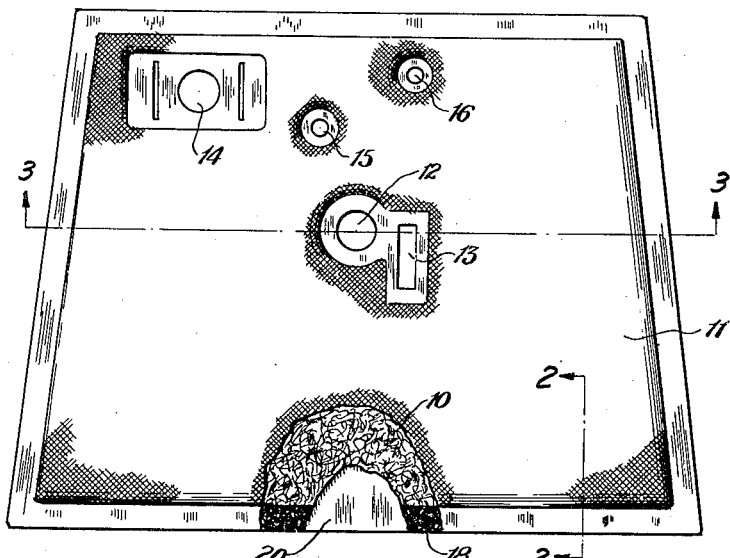

In the drawing to which I shall presently refer in detail, I have shown the preferred forms of a composite mat embodying my invention, and although the particular kind of mat illustrated, is an automobile floor mat, it will be understood, of course, that mats constructed according to my invention may be of any desired size or shape, and may be used for various purposes.

Figure 3:
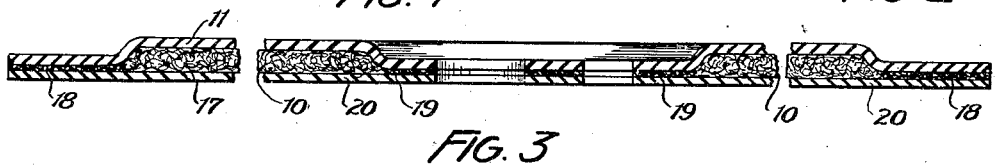
Fig. 3 is a transverse sectional view taken on the line 3—3 of Fig. 1.

As illustrated in Figs. 1 and 3, the composite mat of my invention is provided with a yielding pad 10, over which extends a tread or cover sheet 11 formed of suitable material, such as soft rubber. This rubber tread forms a protective covering for the yielding pad and provides the mat with a wear surface having a clean and attractive appearance. The yielding pad may be of any appropriate material, such as a layer or bat of felt, which gives the mat a cushion-like characteristic.

The mat illustrated in this instance is a floor mat of appropriate shape for use in the driver's compartment of a motor vehicle, and is accordingly provided with suitably located cut-outs or openings to accommodate the various control members, such as the openings 12 and 13 for the gear shift and brake lever, and the openings 14, 15 and 16 through which extend, respectively, the steering column, the accelerator pedal, and the starter button. The yielding pad is preferably, although not necessarily of the same size as the rubber tread and may be secured to the latter by cementing, or by the rubber tread being vulcanized in contact with the pad.

I am aware that a floor mat construction, as thus far described, is well known in the art, a floor mat of this type being disclosed in United States Patent No. 1,715,525. According to my invention, however, the yielding pad is formed with a cushion section 17, of which the fibers are loosely compacted, and integral border sections 18 and 19 extending, respectively, along the edges of the pad and around the control openings, and having the fibers thereof tightly compacted, or at least tightly compacted as compared with the cushion section. The fibers of these border sections are permanently retained in the tightly compacted condition by being impregnated with, or compacted in contact with, a suitable binding material. As such a binding material I prefer to use a vulcanizable rubber solution, although various materials may be used, which, upon solidification, will serve to connect the fibers together, such as glue, cement or certain types of oils.

The tightly compacted border sections thus formed provide tough protective margins which prevent stretching or fraying of the pad. These border sections may be of any desired width, and are preferably formed, as shown in Fig. 3, with the bottom surface thereof extending flush with the bottom surface of the cushion section, and the top surface thereof depressed below the top surface of the cushion section. The rubber tread, which is of substantially uniform thickness, extends over the border sections as well as the cushion section, that portion of the tread which extends over the border sections being depressed below the portion of the tread which covers the cushion section. If desired, the substantially flat under surface of the pad may be provided with a protective covering in the form of the rubber sheet 20, which may be of the same size and shape as the tread 11, but is preferably somewhat thinner than the latter.

The composite mat which I have described can be constructed according to any suitable method which will result in the formation of, and relative arrangement of the parts as illustrated in the drawing. According to one such method, the pad 10, the rubber tread 11, and the backing sheet 20 may be formed separately, and thereafter assembled in the relative positions shown in Fig. 3, and secured together by the use of cement or other adhesive applied either to the entire area of the contacting surfaces, or to various portions of those surfaces. When the mat is made up of preformed parts in this manner, it will be understood of course that in making the yielding pad 10, the border sections 18 and 19 thereof are formed by treating or impregnating these portions of the pad with binding material, which, upon compression and solidification, results in the fibers being permanently retained in a tightly compacted condition.

According to another method which may be employed, the rubber tread 11 is molded and vulcanized in contact with the top surface of the yielding pad 10. The vulcanization of the tread in contact with the pad results in a firm union being obtained between the rubber and the fibers of the pad. When this method is employed, the border sections of the pad are preferably impregnated with a vulcanizable rubber solution, and during the vulcanizing operation, which forms the tread and attaches the same to the pad, these sections of the pad are compressed, and upon vulcanization or solidification of the binding material the fibers of the border sections are retained in a tightly compacted condition. After this vulcanizing operation, the yielding pad, which has been subjected to the heat and pressure necessary for vulcanizing the rubber of the tread, may be treated to restore the resiliency of the cushion section 10. Any suitable treatment may be used for this purpose, but I prefer to employ a steaming operation which results in the cushion section being restored to substantially its original condition, but which does not expand, or in any way affect the tightly compacted border sections. The backing sheet 20 may then be applied and attached to the under surface of the pad by the use of appropriate means, such as a suitable cement.

Various other methods or combinations of steps may be employed in producing my composite mats, for example, the yielding pad may be initially prepared by impregnating the border sections thereof with the binding material and compressing those sections to the desired compacted condition. Thereafter the compacted border sections may be cemented to the rubber tread while the cushion section of the mat may either be left loose or may be attached to the rubber tread by cementing or vulcanization.

It should be understood, that while I have disclosed methods which may be employed in constructing my composite mat, it is not essential that the article be constructed in this manner, since the formation of the yielding pad with its tightly compacted integral border sections, and the attachment of this pad to the rubber tread or to the backing sheet, may be accomplished in various ways.

Figure 4:
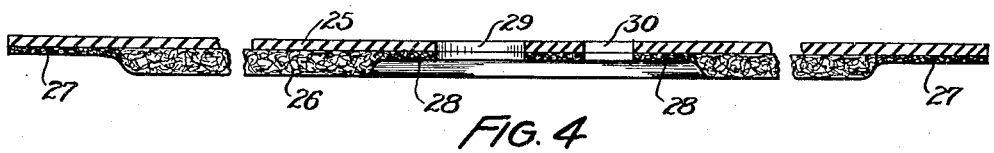
Fig. 4 is a transverse sectional view of another composite mat embodying my invention.

In Fig. 4 of the drawing I have illustrated another form of composite mat comprising a rubber tread 25 extending over and secured to the top surface of a yielding pad 26. This pad is constructed with a cushion section, and with tightly compacted impregnated border sections 27 and 28 extending, respectively, along the edges of the mat and around the control openings 29 and 30. The mat illustrated in this figure is similar to the construction illustrated in Fig. 3, with the exception that the rubber backing sheet 20 has been omitted, and the rubber tread 25 is maintained substantially flat throughout its extent.

Figure 5:
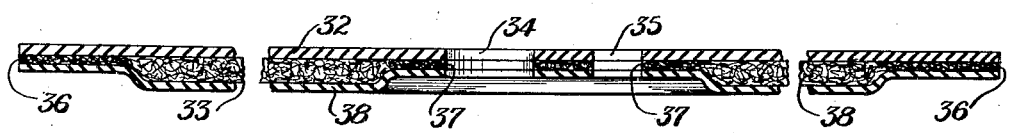
Fig. 5 is a sectional view of another mat constructed according to my invention.

In Fig. 5 of the drawing I have illustrated another form of mat which represents a combination of the mat features illustrated in Figs. 3 and 4. The mat, as illustrated in this figure, is provided with a substantially flat rubber tread 32 which extends over, and is secured to, the top surface of the yielding pad 33. Along the edges of the mat and around the control openings 34 and 35, the material of the pad is impregnated with binding material and is compressed or compacted to form the border sections 36 and 37. In this form of mat the bottom surface of the cushion section of the pad is disposed below the bottom surface of the border sections by an amount corresponding to the extent to which the border sections have been compressed. A backing sheet 38, preferably formed of rubber, extends over and follows the contour of the bottom surface of the pad.

During the construction of the composite mats which I have described, the top surface of the rubber tread is preferably provided with a suitable pattern or configuration, which may be formed during the molding and vulcanizing of the rubber tread. As shown in the drawing, the tread is preferably provided with a border which extends around the patterned section and also around the cutouts for the vehicle controls. This border, which in Fig. 1 is shown as being plain or smooth surfaced, may be of any desired width but preferably corresponds with the width of the compacted border sections 18 and 19.

Figure 2:
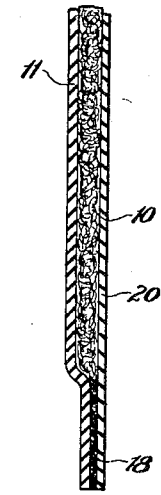
Fig. 2 is a partial sectional view thereof taken on the line 2—2 of Fig. 1.

Reverting to the form of my composite mat as illustrated in Figs. 1, 2 and 3, it should be clearly understood that although I have shown a backing sheet 20, and in some instances a mat having such a sheet, might be desirable, this sheet may be omitted if desired, in which case the tread 11 and the pad 10, as shown in these figures, would constitute a complete and serviceable mat.

It will now be readily understood that I have provided a novel form of composite mat embodying a yielding pad having the edges thereof protected against stretching or fraying by being treated or impregnated with a binding material, which, upon solidification, firmly connects the fibers of these portions of the mat together. In providing the yielding pad with tightly compacted border sections, it will also be seen that the thickness of the mat is materially reduced at its edges thus forming a flexible margin, of any desired width, which will tend to lie close to the floor or other surface to which the mat is applied.

Furthermore in forming the yielding pad with the border sections thereof impregnated and tightly compacted, so that the edges of the pad may extend out to the extreme edges of the rubber tread without danger of fraying or stretching, the production of composite mats is greatly facilitated because the rubber tread need not be of any special form but may be simply a sheet of rubber. The provision of the impregnated and compacted border sections also affords a tighter connection between the rubber tread and the yielding pad at those points where separation would be most likely to occur during use of the mat, namely along its edges, because a cement or other connecting agent is more effective when applied to a tightly compacted body of fibers than when applied to similar fibers in a loosely compacted condition.

Although I have illustrated and described the device of my invention in a detailed manner, it will be understood, of course, that I do not intend to limit myself to the precise details of construction and arrangement of parts illustrated and described, but regard my invention as including such changes and modifications as do not involve a departure from the spirit of the invention and the scope of the appended claims.

Having thus described my invention, I claim:

1. A mat comprising a soft rubber tread, and a pad of fibrous material attached to the under surface thereof, said pad being impregnated along edge portions only thereof with binding material.

2. A mat comprising a soft rubber tread, and a cushion attached to the under surface of said tread, said cushion being formed with a center section of loosely compacted fibers and a border section of tightly compacted fibers.

3. A mat comprising a soft rubber tread, and a fibrous cushion attached to the under surface thereof, said cushion being provided with an integral tightly compacted border section, the fibers of said border section being held together by solidified binding material.

4. A mat comprising a soft rubber tread, and a cushion coextensive with said tread, said cushion being formed as a body of loosely compacted fibers having an integral border section, the fibers of said border section being treated with binding material and tightly compacted together.

5. A composite article of the character described comprising a felt pad, and a rubber tread extending over the top surface thereof, said pad having a cushion section of loosely compacted fibers and integral border sections, the fibers of said border sections being tightly compacted in contact with a vulcanizable substance.

6. A composite article of the character described comprising a fibrous pad, and a rubber tread extending over the top surface thereof, said pad having a cushion section of loosely compacted fibers and an integral tightly compacted border section, the fibers of said border section being held together by vulcanized rubber.

7. A composite floor mat for a motor vehicle compartment comprising a felt pad, and a rubber covering coextensive therewith, said covering and said pad being provided with openings therethrough to accommodate vehicle control members, said pad being provided with integral tightly compacted border sections extending along one or more edges of the mat and around said openings, the fibers of said border sections being held together by solidified binding material.

8. A composite article of the character described comprising a fibrous pad, and sheet rubber covering extending over the top and bottom surfaces thereof, said pad having a cushion section of loosely compacted fibers and an integral tightly compacted border section, the fibers of said border section being held together by solidified binding material.

9. A mat having an upper tread portion and a backing portion, the backing portion having a central section of relatively loose fibers and a border section of relatively compacted fibers.

10. A mat having a tread portion and a backing portion substantially coextensive with the tread portion, said backing portion constituting a pad having a central section formed of relatively loose fibers and an integral border section formed of relatively compacted fibers.

BUDD BRONSON.